United States Patent [19]
Dealey, Jr. et al.

[11] Patent Number: 5,483,427
[45] Date of Patent: Jan. 9, 1996

[54] CARGO AREA LIGHTING SYSTEM FOR TRUCKS

[76] Inventors: O. K. Dealey, Jr., 33751 Heritage Hill, Farmington Hills, Mich. 48331; John L. Stratford, 5014 Lauderdale Ave., LaCrescenta, Calif. 91214; John A. Robbins, 24722 Eldamar Ave., Lake Forest, Calif. 92630

[21] Appl. No.: 327,202

[22] Filed: Oct. 21, 1994

[51] Int. Cl.$^6$ ............................................. B60Q 3/06
[52] U.S. Cl. ........................ 362/80; 362/32; 362/74; 362/330
[58] Field of Search ................................ 362/32, 61, 74, 362/80, 330

[56] References Cited

U.S. PATENT DOCUMENTS

| | | | |
|---|---|---|---|
| 2,101,748 | 12/1937 | Michel et al. | 362/80 |
| 2,587,807 | 3/1952 | Arenberg et al. | 362/74 |
| 4,740,870 | 4/1988 | Moore et al. | 362/32 |
| 4,811,172 | 4/1989 | Davenport et al. | 362/61 |
| 4,947,293 | 8/1990 | Johnson et al. | 362/32 |
| 5,050,047 | 9/1991 | Viner et al. | 362/32 |
| 5,122,933 | 6/1992 | Johnson | 362/32 |
| 5,184,883 | 2/1993 | Finch et al. | 362/32 |

*Primary Examiner*—Ira S. Lazarus
*Assistant Examiner*—Alan B. Cariaso
*Attorney, Agent, or Firm*—Reising, Ethington, Barnard & Perry

[57] ABSTRACT

A lighting system using piped light is provided for the cargo space of a truck. A light source mounted on the truck body is energized by the truck electrical system through a switch in the cab. Plural lighting fixtures are mounted to the roof of the truck body for illuminating the cargo space. Each lighting fixture receives light which is piped through a separate light guide from the source to the fixture. There are two sets of lighting fixtures each of which is disposed in a linear array extending along a line from the front to the rear of the truck body. The light guides for one set of lighting fixtures are all disposed in a first enclosure and the light guides for the other set of lighting fixtures are all disposed within a second enclosure. Certain sections of the enclosures are provided with a transparent lens and certain light guides within the enclosures emit side light through the lens. A lighting fixture at the rear door of the truck body is provided with an optical switch for turning the lighting fixture on or off.

3 Claims, 2 Drawing Sheets

CARGO AREA LIGHTING SYSTEM FOR TRUCKS

FIELD OF THE INVENTION

This invention relates to truck lighting systems; more particularly, it relates to a lighting system for the cargo handling area of a truck using piped light.

BACKGROUND OF THE INVENTION

As is well-known, trucks having fully enclosed cargo space within the truck body are provided with a lighting system to facilitate loading and unloading of the cargo. Typically, the truck body, especially long haul trucks, is long relative to its height and width to provide the desired cargo capacity. The longstanding practice in lighting the interior of the truck body has been to use a plurality of incandescent lamps mounted in the roof of the truck body and spaced from each other from front to rear. Typically, the lighting fixtures comprise a lamp housing recessed into the roof and enclosing an incandescent lamp and having a light distributing lens disposed on the housing between the housing and the cargo space so it is generally flush with the interior surface of the roof. This arrangement provides the required illumination without the light fixture intruding into the cargo space.

The conventional incandescent lighting system described above has been found to be unsatisfactory because it is wasteful of energy, requires ongoing maintenance and it is sometimes used in such a manner that it constitutes a fire hazard. In refrigerated trucks, i.e. those which have a refrigeration system for the cargo space, the heat generated by the incandescent lamps is largely dissipated into the refrigerated cargo space thus requiring more energy for refrigeration. Also, it is known that some truck drivers like to increase the illumination in the cargo space by replacing the standard low wattage incandescent lamps with higher wattage with the result of increased heat generation and shortened life of the bulbs. This practice adds to the cost of bulb replacement in the maintenance of the lighting system. Additionally, the conventional incandescent lighting system constitutes a fire hazard, especially when the truck body is loaded with cargo close to the incandescent lamp fixtures and the lights are inadvertently left on for a long time. Such conditions can cause truck fires which are not only dangerous to life and limb but also constitute increased costs to the trucking industry by reason of loss and increased insurance premiums.

There has been a longstanding need in the trucking industry for a safe, effective and energy efficient lighting system for the cargo space in a container body of a truck.

In the prior art, certain fiber optic or "light pipe" systems have been proposed for use on vehicles. The Johnson et al. U. S. Pat. No. 4,947,293 granted Aug. 7, 1990 discloses a clearance lighting system for a semi trailer cargo container body. The lighting system includes a core light conducting material in the form of an elongated light conducting strip provided with a cladding material to provide a light guide. The core and cladding are constructed to provide lateral light emission as well as longitudinal propagation. A light source is adapted to end-illuminate the light guides for both sides of a container body from a single light source. A similar system which also provides a message panel is disclosed in Johnson U.S. Pat. No. 5,122,933 granted Jun. 16, 1992.

The Moore et al. U.S. Pat. No. 4,740,870 granted Apr. 26, 1988 describes a fiber optic lighting system for boats. In this system, a plurality of fiber optic cables extend from a central light source to respective plurality of remote light fixtures to provide lighting at different locations on the boat.

The Davenport et al. U.S. Pat. No. 4,811,172 granted Mar. 7, 1989 describes an optical fiber lighting system particularly suited for automobiles and air craft. The lighting system comprises subsystems suitable for high and low beam illumination and rear illumination of an automobile. Each subsystem comprises a high intensity light source coupled to one end of each of a plurality of light pipes with each having their other end positioned relative to a reflective element and a lens. The reflective elements are arranged to provide a prescribed illumination pattern.

The Finch et al. U.S. Pat. No. 5,184,883 granted Feb. 9, 1993 discloses an automobile lighting system similar to that described in the above-referenced Davenport U.S. Pat. No. 4,811,172. The Finch et al. patent describes an indicating device that comprises a shutter having an opaque portion, a light blocking position in which the opaque portion blocks the passage of light from the output end of a light guide to a lens and a non-blocking position in which light is allowed to pass through the indicating device to the lens.

A general object of this invention is to provide an improved lighting system for the cargo space of a truck which overcomes certain disadvantages of the prior art.

SUMMARY OF THE INVENTION

In accordance with this invention, an improved lighting system is provided for the cargo space of a truck body. The lighting system provides desired levels of illumination throughout the cargo space by using a piped light system which is highly efficient, simple and economical to install without intruding into the cargo space and which requires little maintenance. Further, the lighting system may be controlled from the truck cab while the high voltage required for the light source is confined to the light source housing which is disposed away from the cab and on the outside of the truck body. By using light piped into the cargo space there is virtually no heat dissipation from the lighting system in the cargo space and therefore waste of energy in refrigerated truck bodies is avoided, as compared with incandescent lamps. Further, the risk of fire hazard from the lighting system is eliminated.

Further, in accordance with the invention, the lighting system for the interior of a truck body comprises an electrically energized light source mounted on the truck body, an electrical energizing circuit extending from the cab to the light source and a switch in the cab for turning the light source on or off. At least one set of lighting fixtures is provided in an array extending generally from the front to the rear of the truck body and supported by the roof. Each one of a set of light guides extends from the light source to one of the light fixtures and transmits light from the source to the respective fixture.

Further, in accordance with the invention, the set of light guides is contained within an elongated light guide enclosure which is provided with a transparent lens extending alongside the light guides. Selected ones of the light guides provide side light emission through the lens for illumination of the adjacent area.

Further, in accordance with the invention, a lighting fixture is disposed adjacent the rear door of the truck body and is provided with an optical switch for turning the fixture on or off.

A complete understanding of this invention may be obtained from the detailed description that follows taken with the accompanying drawings.

BEST MODE FOR CARRYING OUT THE INVENTION

Figure 1:
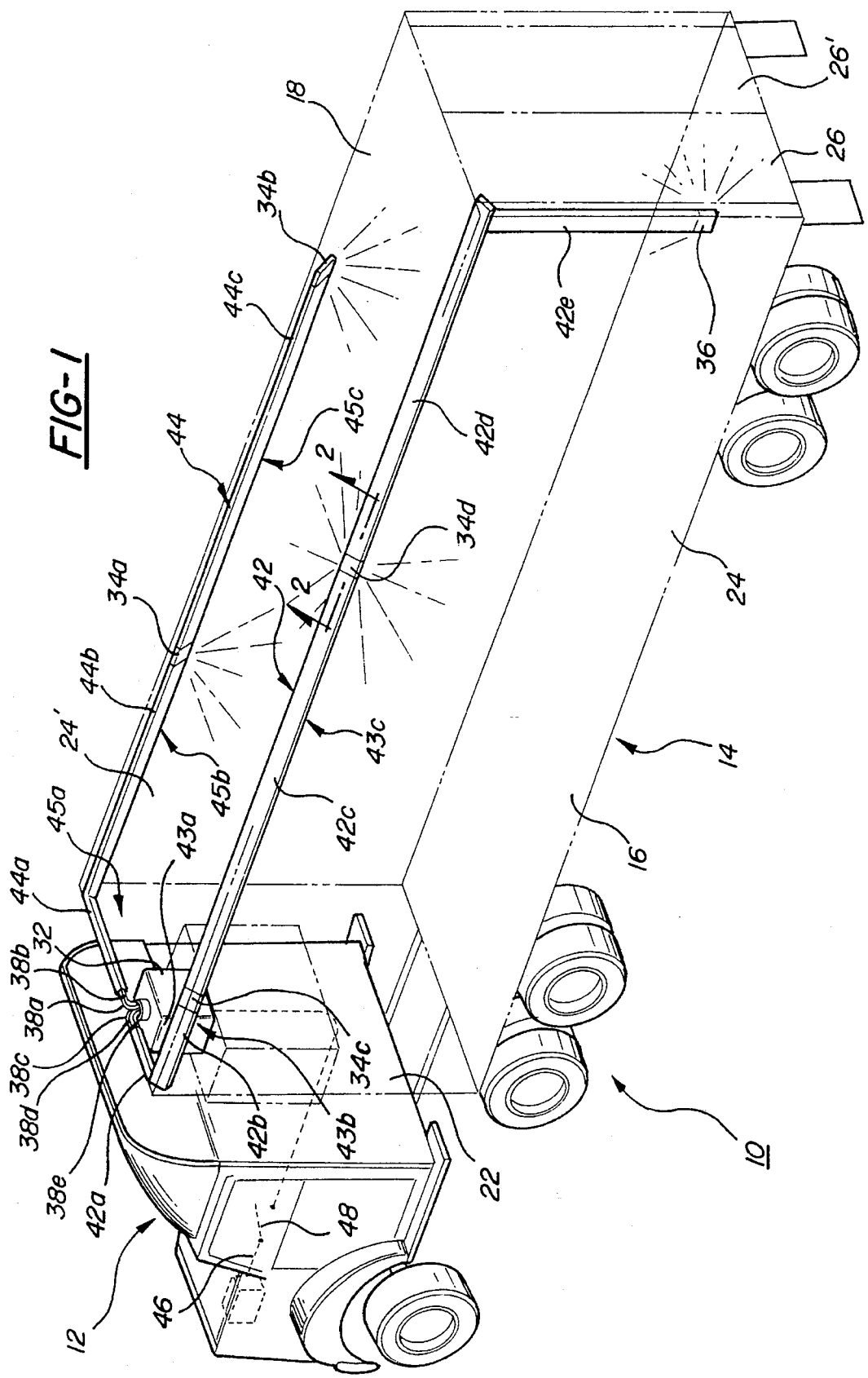
FIG. 1 is a perspective view showing the truck body lighting system of this invention.

Referring now to the drawings, there is shown an illustrative embodiment of the invention in a truck body interior lighting system using piped light. It will be appreciated as the description proceeds that the invention may be used in other applications and may be realized in different embodiments.

FIG. 1 shows a trailer truck 10 having a cab 12 and a truck body 14, the outline of which is shown in phantom lines. The truck body includes a floor 16, a roof 18, a front wall 22, side walls 24 and 24' and a rear wall including doors 26 and 26'. The truck body encloses a cargo space which is refrigerated by a refrigeration unit 28.

The lighting system for the cargo space, in accordance with this invention, comprises a light source 32 suitably mounted on the exterior of the front wall 22 above the refrigeration unit 28. The lighting system also comprises a plurality of lighting fixtures 34a, 34b, 34c, 34d and 36 (referred to later herein as end-fire lighting fixtures) which are disposed within the cargo space, as will be described. Further, the lighting system comprises a plurality of light guides 38a, 38b, 38c, 38d and 38e, each of which extends from the light source to a selected one of the light fixtures. Further, the lighting system includes a pair of light guide enclosures 42 and 44 which contain selected sets of the light guides and which may provide strip lighting between the fixtures. The enclosure 42 includes enclosure sections 42d and 42e and also includes enclosure sections 42a, 42b and 42c which form part lighting fixtures 43a, 43b and 43c (referred to later herein as side-fire lighting fixtures). The enclosure 44 includes enclosure sections 44a, 44b and 44c which form part of lighting fixtures 45a, 45b and 45c (herein referred to as side-fire lighting fixtures). The aforementioned components of the lighting system will now be described in greater detail.

The light source 32 comprises a high intensity lamp of the type described in the Robbins et al. U.S. Pat. No. 4,704,660 granted Nov. 3, 1987. Such light sources are available from General Electric Company and Luminyte International Corporation. Light sources of this type are commonly known as "light engines". The light source 32 is provided with a plurality of light ports each of which is adapted for optical coupling with a light guide in a well-known manner. A light source is energized from the truck electrical system through an electrical conductor 46 which includes a manually actuable switch 48 mounted in the cab for operation by the driver. The light source includes a voltage inverter for developing a high voltage alternating current supply from the low voltage DC supply from the truck.

The light guides 38a, 38b, 38c, 38d and 38e are light conductors of the type constructed of polymeric material with a suitable cladding. The light guides are preferably of the type known as solid core semi-rigid fiber optics such as that described in Zarian U.S. Pat. No. 4,957,347 granted Sep. 18, 1990. Such light guides are available from the Luminyte International Corporation. The light guides are commonly referred to individually as an "optic". The preferred light guide for this invention is of a type identified as side-light fiber optic because it has the property of emitting light radially through the cladding around the core and also conducts light axially for emission through the end of the core (referred to herein as a side-fire/end-fire light guide). It will be understood that the lighting system of this invention may also use light guides extending between the light source and selected ones of the light fixtures which do not provide side light emission but instead emit light only from the output end (referred to herein as end-fire light guides).

The light guides 38a and 38b extend from the light source 32 to the end-fire lighting fixtures 34a and 34b, respectively, through the side-fire lighting fixtures 45a, 45b and 45c. Each of the light guides has an input end coupled with one of the ports of the light source and has an output end in the respective lighting fixture, as will be described. The light guides 38c and 38d extend from the source to the end-fire lighting fixtures 34c and 34d, respectively, through the side-fire lighting fixtures 43b and 43c. The light guide 38e extends from the source to the end-fire lighting fixture 36 through lighting fixtures 43a, 43b, 34c, 43c, 34d and enclosure sections 42d and 42e.

Figure 2:
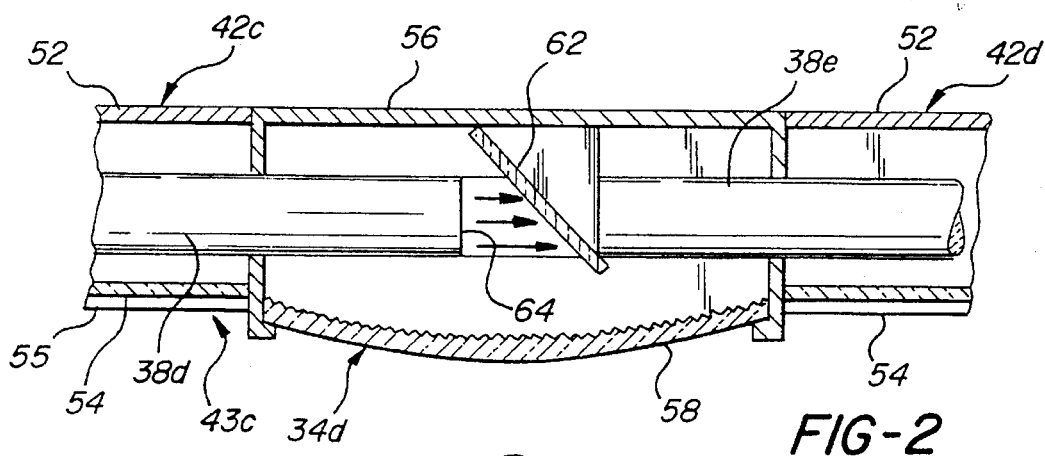
FIG. 2 is a cross-sectional view of lighting fixtures taken on lines 2—2 of FIG. 1.

All of the end-fire lighting fixtures 34a, 34b, 34c and 34d are of the same construction and further, all of the light guide enclosure sections 44a, 44b, 44c, 42a, 42b and 42c and all of the side-fire lighting fixtures 43a, 43b, 43c, 45a, 45b and 45c are of the same construction. Accordingly, description of only lighting fixture 34d and enclosure section 42c will suffice and will be given with reference to FIG. 2. The light guide enclosure 42c comprises an elongated channel 52, suitably a metal extrusion, which opens downwardly. The channel 52 is of relatively shallow depth and is adapted to be mounted to the roof or the upper wall of the truck body. It may be suitably inclined from the vertical by a small angle. It is preferably recessed into the roof or wall but may be surface mounted if desired. The channel 52 is closed at the bottom by a transparent panel, suitably a clear plastic lens 54 which is supported by in-turned flanges 55 on the edges of the channel. The light guides 38c, 38d and 38e are disposed within the enclosure section 44c in a side-by-side relationship. The lens 54 is disposed between the light guides and the cargo space of the truck body.

The side-fire lighting fixture 43c comprises the light guide enclosure 42c and the side-fire light guides 38c and 38d which emit side-light through the lens 54 to produce a strip lighting effect.

The end-fire lighting fixture 34d comprises a housing 56 which has the same vertical cross-section as the channel 52. The housing 56 is closed at the bottom by a transparent light distributing lens 58 which is supported by the housing. A mirror 62 is mounted to the housing 56 and is inclined at an angle of about forty-five degrees relative to the roof 18. The light guide 38d extends generally parallel with the roof 18 and has its output end 64 disposed adjacent the surface of the mirror 62. Light emitted from the output end 64 impinges onto the mirror 62 and is reflected toward the light distributing lens 58 which disperses the light over an area in the cargo space of the truck body. It is noted that the light guide 38e extends through enclosure section 42c the light housing 56 into the adjoining enclosure section 42d to the lighting fixture 36. The arrangement of light guides 38d and 38e relative to the light guide enclosure sections 42c and 42d and relative to end-fire lighting fixture 34d is typical of the other lighting fixtures in the system. Light guide 38e extends through the light guide enclosure sections 42a, 42b and 42c, as well as lighting fixtures 34c and 34d and then continues to light guide enclosure sections 42d and 42e to the lighting fixture 36.

Figure 3:
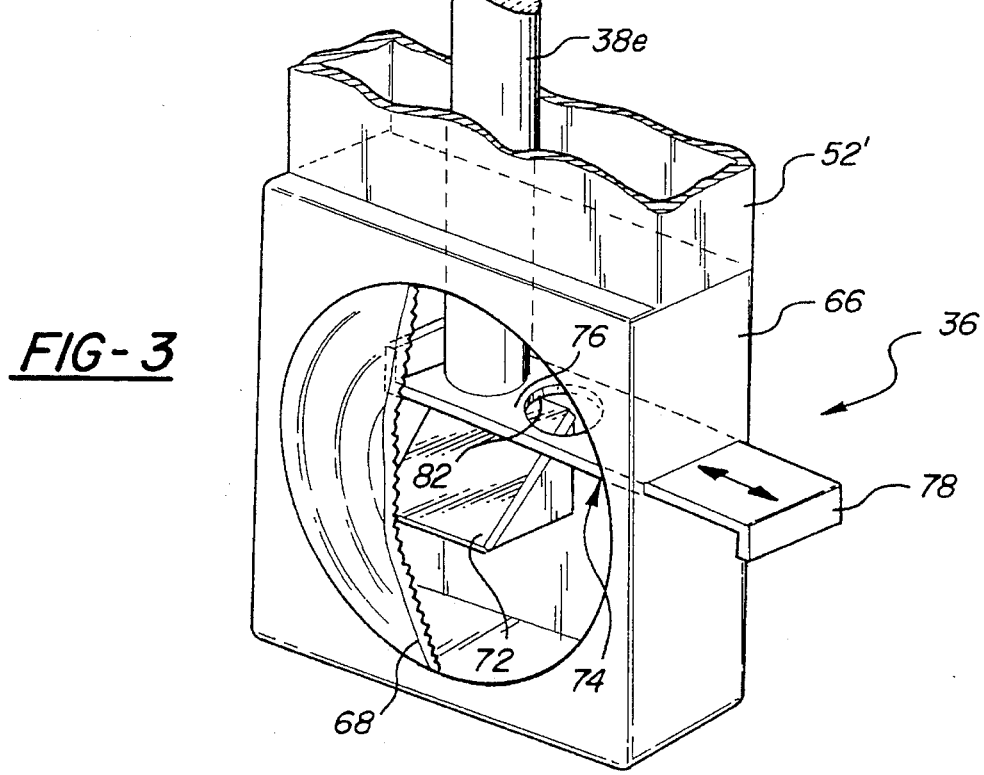
FIG. 3 is a perspective view of another lighting fixture.

The lighting fixture 36 is illustrated in FIG. 3. The light guide 38e is preferably of the type which emits light only at the output end, i.e. without side light emission. Accordingly, the enclosure sections 42d and 42e may take the form of an opaque rectangular conduit 52'. Alternatively, they may be of construction as the other enclosure sections except that the panel 54 may be opaque rather than transparent. The lighting fixture 36 comprises a housing 66 which has a transverse cross-section the same as that of enclosure 42e. A light distributing lens 68 is disposed over the open side of the housing 66 for transmitting light to the cargo space of the truck body. A mirror 72 is mounted to the housing 66 at an angle of about forty-five degrees relative to the roof 18. The light guide 38e has its output end disposed adjacent the mirror 72. An optical switch in the form of a shutter 74 is provided in the housing 66 for turning the lighting fixture on and off. The shutter comprises a manually actuable slide plate 76 which is slidably mounted in the housing 66 and provided with a handle 78. The slide plate 76 is opaque and provided with an aperture 82 in alignment with the output end of the light guide 38e when the shutter is in the on position and which is misaligned with the output end of the light guide 38e when the shutter is in the off position.

Another embodiment of the end-fire and side-fire lighting fixtures will now be described with reference to FIG. 4. In this embodiment, the light guide enclosures 42 and 44 may be constructed without interruption for placement of end-fire lighting fixtures and side-fire lighting fixtures at desired locations. Thus, the channel 52 and the lens 54 may be constructed in one continuous piece of such length as is desired.

Figure 4:
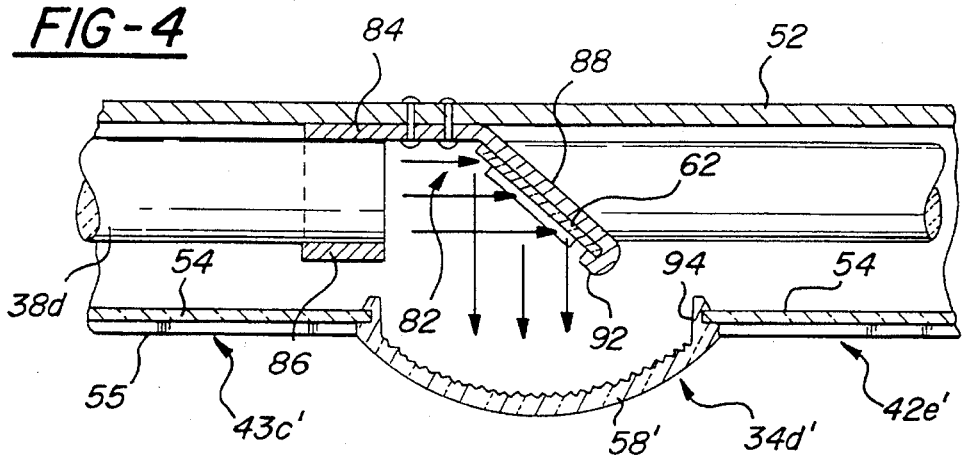
FIG. 4 is a cross-section view of an another embodiment of the lighting fixtures.

FIG. 4 illustrates end-fire lighting fixture 34d' (which corresponds with lighting fixture 34d of FIG. 2) and it also illustrates side-fire lighting fixture 43c' (corresponding with fixture 43c) and it also illustrates enclosure section 42e' (corresponding to section 42e). Light guide 38d terminates at fixture 34d' and is supported at its end by a bracket 82. The bracket 82 has a flat body portion 84 which is secured by rivets to the top plate of channel 52. A pair of flanges 86 (only one shown) extend laterally from the body 84 and are bent circumferentially around the end of light guide 38d. The bracket 82 includes a mirror support arm 88 integral with the body 84 and extending therefrom at an angle of about forty-five degrees. The arm 88 is provided with a flange 92 on each of three sides which support the mirror 62 by being bent over the edges thereof.

A light distributing lens 58' is mounted to the lens 54 in a position to distribute the light reflected by the mirror 62. The lens 58 is secured to the lens 54 by peripheral flange elements 94 which interlock with the periphery of an opening in the lens 54.

It will be appreciated that this embodiment of the invention permits location of the end-fire lighting fixture 34d' with any arbitrary place along the enclosure and that the side-fire lighting fixtures may be located as desired.

In operation of the lighting system, the truck driver operates the electrical switch 48 to turn on the lighting system to illuminate the cargo space in the truck body. When the switch 48 is turned on the light source 32 is energized and emits light from respective ports to the input ends of the light guides 38a, 38b, 38c, 38d and 38e. Each of the light guides conducts light to its output end and thence to the respective lighting fixtures 34a, 34b, 34c, 34d and 36. Each fixture produces a relatively intense light which is distributed over an area of the cargo space. Each of the light guides 38a and 38b also emits light laterally along its length through the lens 54 in enclosure sections 44a and 44b and light guide 38b extends through and emits side light through the lens 54 in enclosure section 44c. In a similar manner, light guides 38c and 38d emit side light from enclosure section 42a and 42b whereas only light guide 38d emits side light from enclosure section 42c. Also, when the light source 32 is turned on the light guide 38e conducts light from its input end at the source to its output end at the lighting fixture 36. When the shutter 74 in lighting fixture 36 is turned off, no light is emitted through the lens 68. When it is desired to have additional illumination in the vicinity of the doors 26 and 26', the shutter 74 is actuated to the on position and light is emitted through the lens 68.

Although the description of this invention has been given with reference to a particular embodiment, it is not to be construed in a limiting sense. Many variations and modifications will now occur to those skilled in the art. For a definition of the invention reference is made to the appended claims.

What is claimed is:

1. A lighting system for a truck of the type having a cab for a vehicle driver and having a truck body for cargo, said body having cargo space enclosed by a floor, side walls, front and rear walls and a roof, said lighting system comprising:

an electrically energized light source mounted on the truck body, an electrical energizing circuit extending from the cab to the light source, a manually actuated switch electrically connected in said circuit and mounted in the cab for operation by the driver for turning the light source on or off, a plurality of lighting fixtures supported by the body in spaced relation with each other, each fixture including an enclosure and a light distributing lens with the lens disposed between the interior of the enclosure and the cargo space, a plurality of light guides each having an input end and an output end and being adapted to transmit light received at the input end to and emitting said light from the output end, the input end of each of said light guides being optically coupled to said light source for receiving light therefrom, each light guide extending from the light source to a selected one of the lighting fixtures with the output end thereof mounted to the enclosure of the respective fixture and optically coupled with the lens of the respective fixture for emitting light thereon.

2. A lighting system as defined in claim 1 including:

a selected plurality of said light guides extending between said light source and one of said light fixtures, a light guide enclosure extending at least part way between said source and said one light fixture, said enclosure including a light transmitting panel disposed between the interior of the enclosure and the cargo space, said selected plurality of light guides being disposed in said enclosure, and at least one of said selected plurality of light guides having a cladding with an index of refraction which causes said cladding to emit light laterally thereof through said panel.

3. A lighting system as defined in claim 1 wherein:

said truck body includes a cargo door, an additional lighting fixture supported on the container body adjacent the cargo door, said additional lighting fixture including a housing and a light distributing lens, an additional light guide having an input end and an output end and being adapted to transmit light received at the input end to, and emitting said light from, the output end, the input end of said additional light guide being optically coupled to the light source for receiving light therefrom, said additional light guide extending from the light source to the additional lighting fixture with the output end thereof mounted to the housing of the additional fixture and optically coupled with the lens of the additional fixture for emitting light thereon, and a manually actuated optical switch interposed between the output end of the additional light guide and the lens for blocking or unblocking the transmission of light between the output end and the lens.

* * * * *